US010594556B2

(12) United States Patent
Washiro

(10) Patent No.: US 10,594,556 B2
(45) Date of Patent: Mar. 17, 2020

(54) MODEM AND ELECTRONIC DEVICE

(71) Applicant: Yokogawa Electric Corporation, Tokyo (JP)

(72) Inventor: Mitsuhiro Washiro, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/108,177

(22) Filed: Aug. 22, 2018

(65) Prior Publication Data
US 2019/0068448 A1  Feb. 28, 2019

(30) Foreign Application Priority Data

Aug. 29, 2017  (JP) .................................. 2017-164618

(51) Int. Cl.
*H04L 12/24* (2006.01)
*H04W 88/02* (2009.01)
*H04W 4/30* (2018.01)
*H04W 84/14* (2009.01)
*H04B 5/00* (2006.01)
(Continued)

(52) U.S. Cl.
CPC .......... *H04L 41/0869* (2013.01); *H02J 1/108* (2013.01); *H02J 50/10* (2016.02); *H04B 5/0031* (2013.01); *H04B 5/0037* (2013.01); *H04B 5/0081* (2013.01); *H04W 4/30* (2018.02);
(Continued)

(58) Field of Classification Search
CPC ....... H04L 41/0869; H02J 1/108; H02J 50/10; H04B 5/0081; H04B 5/0037; H04B 5/0031; H04W 84/14; H04W 4/30; H04W 88/02; H01Q 1/241
See application file for complete search history.

(56) References Cited

U.S. PATENT DOCUMENTS 6,118,378 A * 9/2000 Balch ................. G08B 13/2474
340/572.7
6,590,542 B1 * 7/2003 Briggs ................... H01Q 7/005
343/742
(Continued)

FOREIGN PATENT DOCUMENTS

GB         2472700 A      2/2011
JP       2012-205379 A   10/2012
(Continued)

OTHER PUBLICATIONS

"Technical Data Sheet VIATOR Bluetooth IF", [online], MACTek, [Retrieved date: Jul. 13, 2017], Internet <URL:https://www.mactekcorp.com/downloads/Technical_Data_Sheet_VIATOR_Bluetooth_IF_Model_010041.zip>.

*Primary Examiner* — Kenneth T Lam
(74) *Attorney, Agent, or Firm* — Sughrue Mion, PLLC

(57) ABSTRACT

A modem configured to communicatively connect a terminal device to a field device according to one aspect of the present invention includes a wireless communicator configured to operate by power supplied in a noncontact manner from the terminal device and to perform short-range wireless communication with the terminal device, a wired communicator configured to operate by power supplied in a noncontact manner from the terminal device and to perform wired communication with the field device, and a controller configured to operate by power supplied in a noncontact manner from the terminal device and to control data exchanged between the wireless communicator and the wired communicator.

15 Claims, 9 Drawing Sheets

(51) Int. Cl.
    *H02J 50/10*     (2016.01)
    *H02J 1/10*     (2006.01)
    *H01Q 1/24*     (2006.01)

(52) U.S. Cl.
    CPC ........... *H04W 84/14* (2013.01); *H04W 88/02* (2013.01); *H01Q 1/241* (2013.01)

(56) References Cited

U.S. PATENT DOCUMENTS

| | | | |
|---|---|---|---|
| 9,331,378 B2* | 5/2016 | Merlin | H01Q 1/2225 |
| 2003/0139163 A1* | 7/2003 | Noda | G06K 19/07758 |
| | | | 455/269 |
| 2003/0197652 A1* | 10/2003 | Yang | G08B 13/2474 |
| | | | 343/742 |
| 2007/0205291 A1* | 9/2007 | Aramaki | G06K 19/07749 |
| | | | 235/492 |
| 2014/0232333 A1 | 8/2014 | Kim et al. | |
| 2014/0327522 A1 | 11/2014 | Birgel et al. | |
| 2015/0236418 A1* | 8/2015 | Ito | H01Q 7/06 |
| | | | 343/788 |
| 2016/0142866 A1* | 5/2016 | Jang | H01Q 1/273 |
| | | | 455/41.1 |
| 2016/0299478 A1* | 10/2016 | Junk | G05B 19/00 |
| 2017/0207535 A1* | 7/2017 | Tsukuda | H01Q 7/00 |
| 2017/0331929 A1* | 11/2017 | Zielinski | H04W 76/10 |
| 2017/0338562 A1* | 11/2017 | Ozenne | G06K 7/10356 |
| 2019/0066915 A1* | 2/2019 | Karnik | H01F 38/14 |

FOREIGN PATENT DOCUMENTS

| | | |
|---|---|---|
| JP | 2014-160464 A | 9/2014 |
| WO | 2014/197779 A1 | 12/2014 |

\* cited by examiner

MODEM AND ELECTRONIC DEVICE

BACKGROUND OF THE INVENTION

Field of the Invention

The present invention relates to a modem and an electronic device.

The present application claims priority based on Japanese patent application 2017-164618, filed on Aug. 29, 2017 and includes herein by reference the content thereof.

Description of Related Art

Generally, in a plant, a factory, or the like (hereinafter referred to as a "plant"), an operator performs maintenance work at regular or irregular intervals from the viewpoints of prevention of abnormal operation, maintenance of performance, and the like. For example, maintenance work such as inspection or maintenance of field equipment (measuring devices or operating devices) which are called field devices is performed in a plant in which a distributed control system (DCS) is constructed.

Maintenance of a field device is often performed using a terminal device such as a computer or a personal digital assistant (PDA) on which a dedicated tool (a field device setting tool) for setting and adjusting the field device is installed. A modem is sometimes used to communicatively connect such a terminal device to a field device. When the terminal device and the field device are communicatively connected through the modem, the terminal device can read various parameters set in the field device and can perform setting of new parameters or the like for the field device.

"Technical Data Sheet VIATOR Bluetooth IF", [online], MACTek, [accessed on Jul. 13, 2017], Internet <URL: https://www.mactekcorp.com/downloads/Technical_Data_Sheet_VIATOR_Bluetooth_IF_Model_010041.zip> (hereinafter referred to as "Non-Patent Document 1") discloses a modem that meets intrinsically safe explosion-proof standards and can perform Bluetooth (registered trademark) communication (hereinafter referred to as "BT communication"). Specifically, the modem disclosed in Non-Patent Document 1 includes a main body that houses a communication circuit for performing BT communication, a modem circuit, and a battery for driving these circuits, and two cables that connect the modem circuit of the main body to a field device. When such a modem is used, BT communication is performed between the terminal device and the modem and wired communication is performed between the modem and the field device via the cables, such that the terminal device and the field device are communicatively connected.

SUMMARY

It is generally necessary for wireless devices to obtain a certification (a wireless standard certification) to comply with the laws and regulations of each country. For wireless portable devices which are used in environments filled with flammable gas and dust and are connected to intrinsically safe equipment, it is necessary to obtain a certification (an explosion-proof certification) to comply with explosion-proof standards based on an intrinsically safe explosion-proof structure in addition to the wireless standard certification described above. It is also necessary for the modem disclosed in Non-Patent Document 1 to obtain a wireless standard certification and an explosion-proof certification since it may be used in environments where flammable gas is used. There is a need to obtain the wireless standard certification and the explosion-proof certification individually for each country or region. Therefore, even if the modem disclosed in Non-Patent Document 1 has obtained a wireless standard certification and an explosion-proof certification in one country, it is necessary to obtain another explosion-proof certificate when a change has been made to obtain a wireless standard certification in another country. Thus, the large amount of time, costs, and personnel are required since a wireless standard certification and an explosion-proof certification need to be obtained individually for each country or region as described above.

The modem disclosed in Non-Patent Document 1 can perform BT communication with a terminal device, is physically separated from the terminal device, and does not need to receive supply of power from the terminal device. Therefore, for example, as compared to a modem that is physically connected to a terminal device and needs to receive supply of power from the terminal device, it is possible to lower the power to a level required for Fieldbus communication, which is advantageous from the viewpoint of an explosion-proof structure. However, since it is necessary to provide a battery in the main body, it is necessary to replace the battery at certain time intervals (for example, every several months). Although it can be considered that replacing the battery becomes unnecessary when a secondary battery is provided in the main body such that the battery is rechargeable. However, the energy for recharging becomes a major problem in terms of an explosion-proof structure and also an increase in size and weight are incurred.

One aspect of the present invention provides a modem and an electronic device which can reduce the time required for certification while incurring no increase in size and weight.

A modem configured to communicatively connect a terminal device to a field device according to a first aspect of the present invention may include a wireless communicator configured to operate by power supplied in a noncontact manner from the terminal device and to perform short-range wireless communication with the terminal device, a wired communicator configured to operate by power supplied in a noncontact manner from the terminal device and to perform wired communication with the field device, and a controller configured to operate by power supplied in a noncontact manner from the terminal device and to control data exchanged between the wireless communicator and the wired communicator.

The above-described modem may further include a storage configured to operate by power supplied in a noncontact manner from the terminal device and storing first data for the field device received by the wireless communicator and second data for the terminal device received by the wired communicator. The controller may be configured to read and output the first data stored in the storage to the wired communicator and to store the second data received by the wired communicator into the storage.

The above-described modem may further include a first loop antenna connected to the wireless communicator, and a magnetic member arranged to cover the first loop antenna except for one surface side of the first loop antenna.

The above-described modem may further include a power supply configured to generate the power from an induced current that flows through the first loop antenna, the induced current being caused by the short-range wireless communication.

The above-described modem may further include a second loop antenna arranged overlapping the first loop antenna. The power supply may be configured to generate the power from induced currents that flow through the first and second loop antennas, the induced currents being caused by the short-range wireless communication.

The above-described modem may further include a battery connected in parallel to an output of the power supply.

In the above-described modem, the one surface side of the first loop antenna which is not covered with the magnetic member may act as a transceiver and receiver which transfers and receives electromagnetic waves used for the short-range wireless communication. The modem may further include a housing, at least a surface of the housing except for the transceiver and receiver being formed of a conductive material.

In the above-described modem, the storage may store status information including information indicating whether or not at least one of the first data and the second data is stored in the storage and information indicating the type of the at least one of the first data and the second data stored in the storage. The wireless communicator may be configured to read the status information stored in the storage in accordance with a read request received from the terminal device and to transmit the read status information to the terminal device.

In the above-described modem, the modem may be mounted on the terminal device, the transceiver and receiver of the modem being in close contact with a position of the terminal device at which an antenna is attached to the terminal device.

In the above-described modem, the first loop antenna and the second loop antenna may be concentric with each other.

In the above-described modem, at least one of the wireless communicator, the wired communicator, and the controller may be configured to operate by the power generated by the power supply and power of the battery.

The above-described modem may further include a booster circuit configured to boost output voltage of the power supply.

In the above-described modem, a circuit including the power supply and the booster circuit, and the battery are connected in parallel.

In the above-described modem, the power supply and the battery connected in parallel to each other may be connected to the booster circuit.

An electronic device according to a second aspect of the present invention may include a terminal device including an antenna and configured to perform short-range wireless communication, and the above-described modem wherein the first loop antenna is disposed close to the antenna of the terminal device.

In the above-described electronic device, the modem may include a power supply configured to generate the power from an induced current that flows through the first loop antenna, the induced current being caused by the short-range wireless communication.

In the above-described electronic device, the modem may further include a second loop antenna arranged overlapping the first loop antenna. The power supply may be configured to generate the power from induced currents that flow through the first and second loop antennas, the induced currents being caused by the short-range wireless communication.

In the above-described electronic device, the modem may include a battery connected in parallel to an output of the power supply.

In the above-described electronic device, the one surface side of the first loop antenna which is not covered with the magnetic member may act as a transceiver and receiver which transfers and receives electromagnetic waves used for the short-range wireless communication. The modem may further include a housing, at least a surface of the housing except for the transceiver and receiver being formed of a conductive material.

In the above-described electronic device, the modem may be mounted on the terminal device, the transceiver and receiver of the modem being in close contact with a position of the terminal device at which an antenna is attached to the terminal device.

According to the one aspect of the present invention, it is possible to reduce the time required for certification while incurring no increase in size and weight.

DETAILED DESCRIPTION OF THE INVENTION

Figure 1:
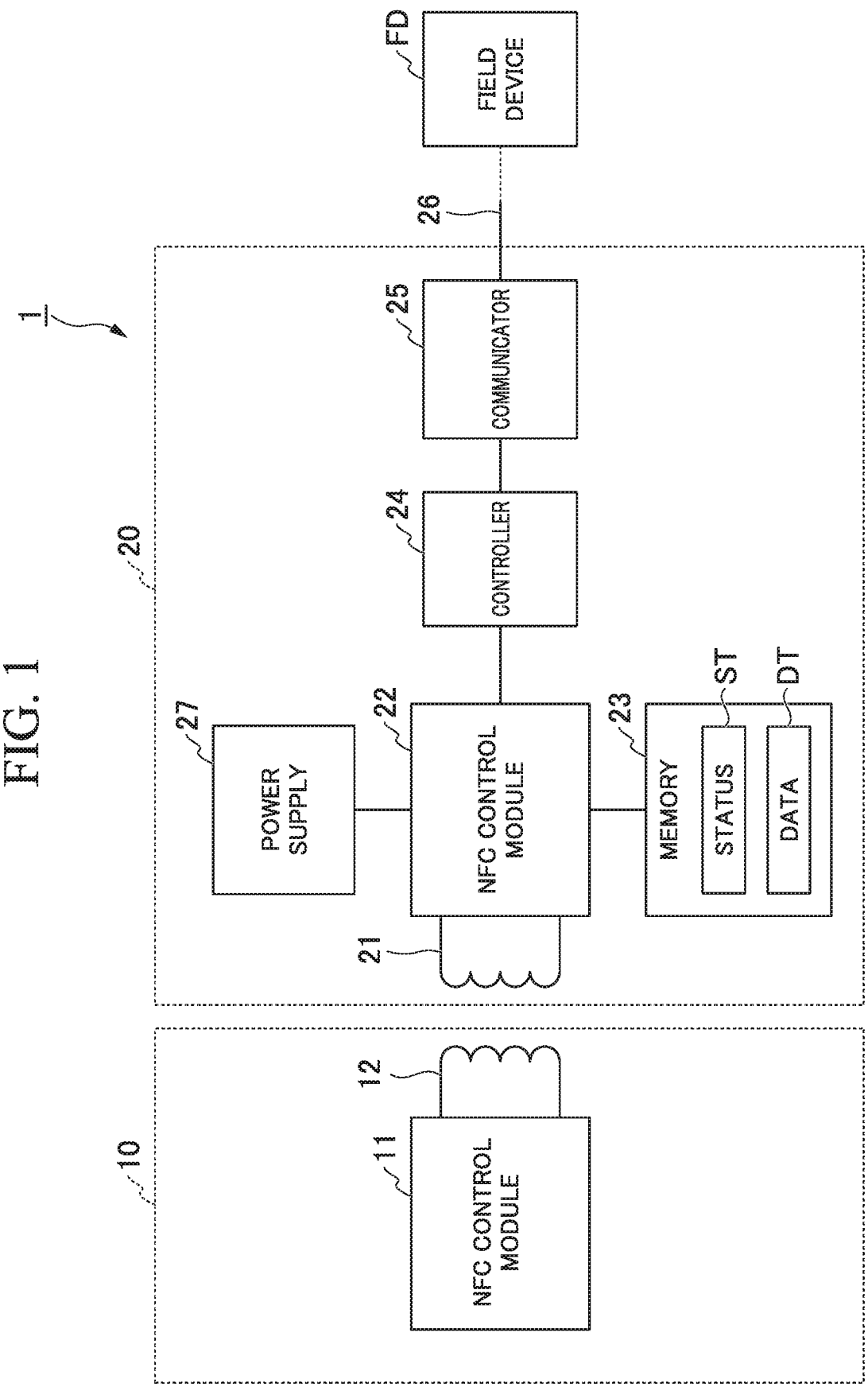
FIG. 1 is a block diagram showing a configuration of main parts of an electronic device according to a first embodiment of the present invention.

Hereinafter, modems and electronic devices according to embodiments of the present invention will be described in detail with reference to the drawings. In the drawings referred to below, dimensions of members are appropriately changed for illustration as necessary for ease of understanding. In the following description, the positional relationship between each of the members will be described with reference to an XYZ orthogonal coordinate system set in the figures as necessary. The position of the origin in the XYZ orthogonal coordinate system is appropriately changed.

First Embodiment

FIG. 1 is a block diagram showing a configuration of main parts of an electronic device according to a first embodiment of the present invention. As shown in FIG. 1, the electronic device 1 of the present embodiment includes a terminal device 10 and a modem 20. In such an electronic device 1, short-range wireless communication is performed between the terminal device 10 and the modem 20 and wired communication is performed between the modem 20 and a field device FD, whereby the terminal device 10 and the field device FD are communicatively connected to each other.

The short-range wireless communication performed between the terminal device 10 and the modem 20 is near field communication (NFC). NFC means communication (noncontact communication) which is possible when the distance between the devices which will communicate is, for example, several tens of cm or less and also includes communication performed in a state where housings of the devices which will communicate are in contact. The wired communication performed between the modem 20 and the field device FD is communication using a general purpose communication protocol for process industries such as HART (registered trademark), BRAIN, Foundation Fieldbus (registered trademark), or PROFIBUS (registered trademark).

The field device FD described above is, for example, a sensor device such as a flow meter or a temperature sensor, a valve device such as a flow rate control valve or an open/close valve, an actuator device such as a fan or a motor, an imaging device such as a camera or video equipment for imaging situations or objects in the plant, audio devices such as a microphone and a speaker for collecting abnormal sounds or the like and issuing an alarm sound or the like in the plant, a position detecting device for outputting position information of each device, or other devices.

The terminal device 10 includes an NFC control module 11 and a loop antenna 12 (an antenna), and performs short-range wireless communication (NFC) with the modem 20. The terminal device 10 is realized by a portable computer of for example a notebook type or a tablet type. The NFC control module 11 performs control of the short-range wireless communication with the modem 20 under the control of a control device (not shown) provided in the terminal device 10. For example, the NFC control module 11 performs control to read a status ST stored in a memory 23 of the modem 20 at predetermined time intervals (for example, every several milliseconds). The details of the status ST will be described later. The purpose of performing such control is to speed up bidirectional communication between the terminal device 10 and the field device FD via the modem 20 and to provide stable supply of power to the modem 20.

The NFC control module 11 transmits data which is to be transmitted to the field device FD through the loop antenna 12 as a wireless signal and receives data from the modem 20 by detecting a load variation in the loop antenna 12. The loop antenna 12 is connected to the NFC control module 11 as an antenna for transmitting and receiving wireless signals that are used in short-range wireless communication. As described above, the terminal device 10 transmits wireless signals at predetermined time intervals such that power is supplied to the modem 20 in a noncontact manner at predetermined time intervals. Therefore, the loop antenna 12 can be regarded as an antenna that transmits power to the modem 20 in a noncontact manner. Although the present embodiment will be described with regard to an example in which the terminal device 10 includes the loop antenna 12, the antenna included in the terminal device 10 is not limited to the loop antenna 12 as long as it enables short-range wireless communication with the modem 20.

The modem 20 includes a loop antenna 21 (a first loop antenna), an NFC control module 22 (a wireless communicator), a memory 23 (a storage), a controller 24, a communicator 25 (a wired communicator), a cable 26, and a power supply 27. The modem 20 performs short-range wireless communication with the terminal device 10 and performs the above-described wired communication with the field device FD. Each of the blocks (the NFC control module 22, the memory 23, the controller 24, and the communicator 25) in the modem 20 operates with power (precisely, DC power rectified and smoothed by the power supply 27) supplied in a noncontact manner from the terminal device 10.

The loop antenna 21 is connected to the NFC control module 22 as an antenna for transmitting and receiving wireless signals that are used in short-range wireless communication. In order to realize short-range wireless communication with the terminal device 10, the loop antenna 21 is disposed close to the loop antenna 12 provided in the terminal device 10. As described above, the modem 20 receives wireless signals transmitted from the terminal device 10 at predetermined time intervals such that power is supplied to the modem 20 in a noncontact manner at predetermined time intervals. Therefore, the loop antenna 21 can be regarded as an antenna that receives power supplied in a noncontact manner from the terminal device 10.

The NFC control module 22 operates with power supplied in a noncontact manner from the terminal device 10. The NFC control module 22 receives data transmitted from the terminal device 10 and transmits data that is to be transmitted to the terminal device 10. The NFC control module 22 transmits data that is to be transmitted to the terminal device 10 by causing a load variation corresponding to the data that is to be transmitted to the terminal device 10. That is, in short-range wireless communication performed between the terminal device 10 and the modem 20, wireless signals are spontaneously transmitted from the terminal device 10, whereas wireless signals are not spontaneously transmitted from the modem 20.

The memory 23 operates with power supplied in a noncontact manner from the terminal device 10. The memory 23 stores the data DT and the status ST (status information). As this memory 23, a nonvolatile memory or a volatile memory may be used. The data DT includes data (first data) for the field device FD received by the NFC control module 22 and data (second data) for the terminal device 10 received by the communicator 25. The status ST is information indicating the status of the modem 20. The status ST includes, for example, information indicating whether or not data DT is stored in the memory 23 or information indicating the type of the data DT stored in the memory 23. The information indicating the type of the data DT includes, for example, information indicating whether the data DT is the first data or the second data described above.

The controller 24 operates with power supplied in a noncontact manner from the terminal device 10. The controller 24 controls data exchanged between the NFC control module 22 and the communicator 25. For example, the NFC control module 22 performs control to read and output the first data stored as data DT in the memory 23 to the communicator 25. The controller 24 performs control to cause the memory 23 to store the second data received by the communicator 25 as data DT.

The communicator 25 is connected to the field device FD via the cable 26. The communicator 25 performs the above-described wired communication with the field device FD via the cable 26. The cable 26 is one that connects the communicator 25 and the field device FD. This cable 26 may be directly connected to the field device FD or may be connected to a transmission line or a network. When the cable 26 is connected to a transmission line or a network, the communicator 25 is connected to the field device FD via the cable 26 and the transmission line or the network.

The power supply 27 generates power to operate each of the blocks in the modem 20 (the NFC control module 22, the memory 23, the controller 24, and the communicator 25) by converting power (AC power) supplied in a noncontact manner from the terminal device 10 into DC power. For example, the power supply 27 includes a rectifying circuit and a smoothing circuit. The power supply 27 rectifies and smooths an induced current that flows through the loop antenna 21 as short-range wireless communication is performed between the terminal device 10 and the modem 20, thereby converting the power (AC power) supplied in a noncontact manner from the terminal device 10 into DC power. Although the present embodiment will be described with regard to an example in which the memory 23 and the power supply 27 are provided separately from the NFC control module 22, at least one of the memory 23 and the power supply 27 may be provided in the NFC control module 22.

Figure 2:
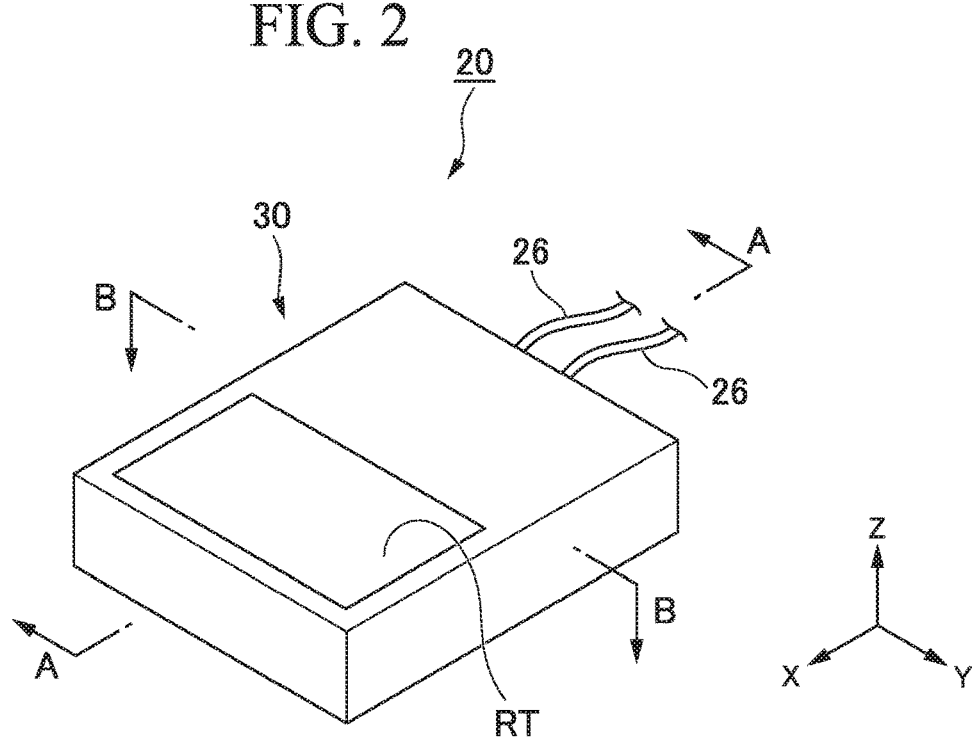
FIG. 2 is a perspective view showing an appearance of a modem according to the first embodiment of the present invention.
Figure 3:
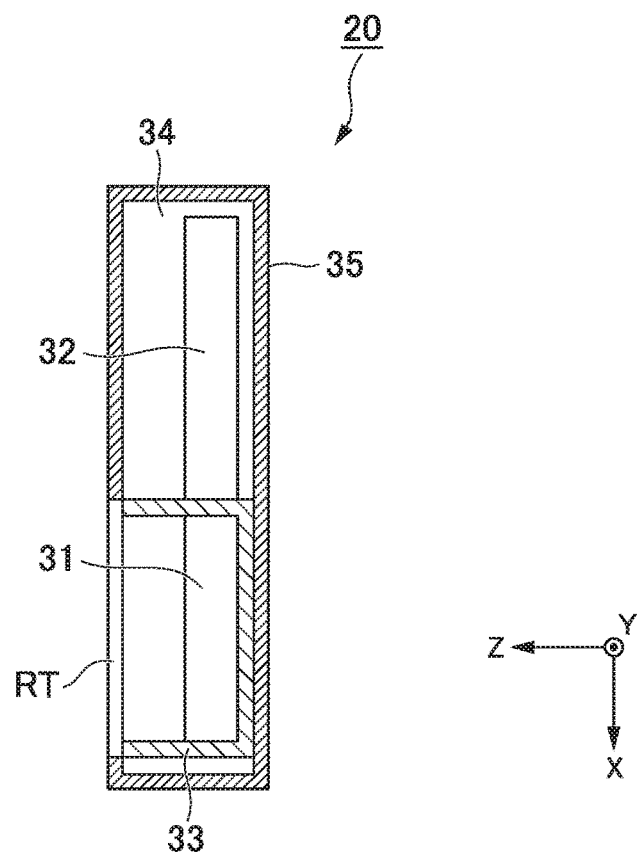
FIG. 3 is a cross-sectional view taken along line A-A in FIG. 2.
Figure 4:
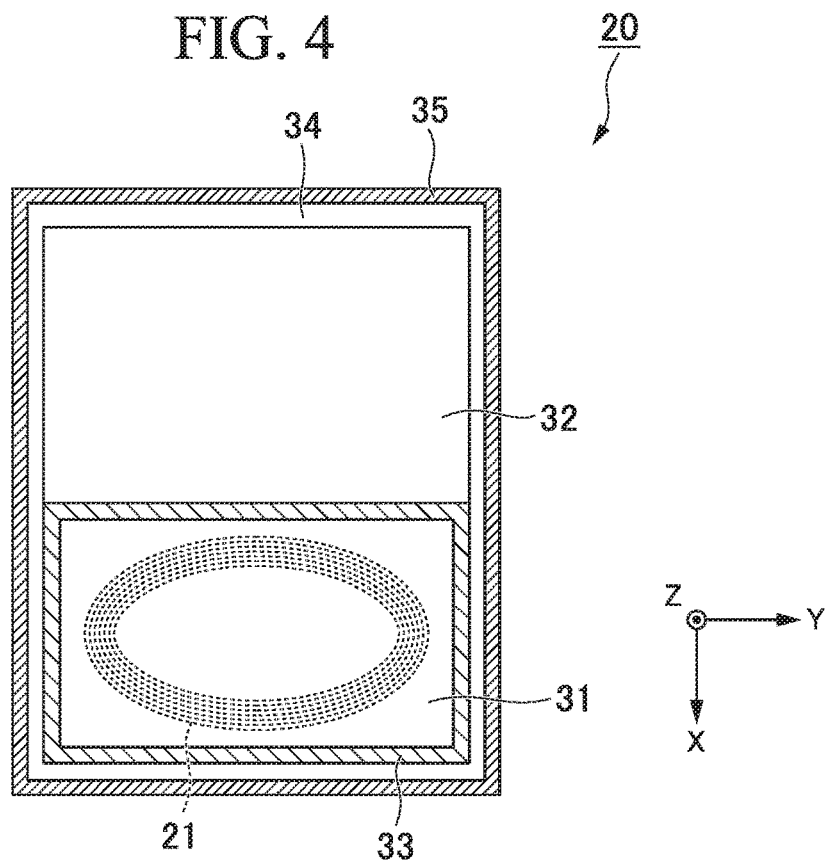
FIG. 4 is a cross-sectional view taken along line B-B in FIG. 2.

FIG. 2 is a perspective view showing an appearance of the modem according to the first embodiment of the present invention. FIG. 3 is a cross-sectional view taken along line A-A in FIG. 2 and FIG. 4 is a cross-sectional view taken along line B-B in FIG. 2. As shown in FIGS. 2 to 4, the modem 20 of the present embodiment includes a main body 30 having a rectangular parallelepiped shape and two cables 26 and 26 extending from a side surface of the main body 30 (a surface thereof parallel to a YZ plane positioned on the –X side of the main body 30). The cables 26 and 26 correspond to the cable 26 shown in FIG. 1.

The main body 30 includes an antenna module 31, a modem circuit board 32, a magnetic member 33, a plastic case 34, and a conductive case 35 (a housing). The antenna module 31 includes, for example, the loop antenna 21, the NFC control module 22, the memory 23, and the power supply 27 shown in FIG. 1. The antenna module 31 is, for example, a plate-shaped module that mainly performs short-range wireless communication with the terminal device 10. The modem circuit board 32 includes, for example, the controller 24 and the communicator 25 shown in FIG. 1. The modem circuit board 32 is, for example, a plate-shaped board that mainly performs wired communication with the field device FD.

The antenna module 31 and the modem circuit board 32 are arranged in the modem 20 such that, for example, the antenna module 31 and the modem circuit board 32 are parallel to the XY plane and are arranged along the X axis such that the antenna module 31 is positioned on the +X side and the modem circuit board 32 is positioned on the –X side. As a result, the loop antenna 21 provided in the antenna module 31 is arranged such that a winding surface thereof is parallel to the XY plane. The antenna module 31 and the modem circuit board 32 are electrically connected via a connector (not shown).

The magnetic member 33 is arranged to cover the loop antenna 21 except for one surface side (the +Z side) of the loop antenna 21. The purpose of arranging the magnetic member 33 in this manner is to efficiently couple electromagnetic fields radiated from the loop antenna 12 of the terminal device 10 to the loop antenna 21 and to obtain magnetic field characteristics equal to or better than those of a free space even under shielding by the conductive case 35. A member formed of ferrite can be used as the magnetic member 33. Further, by inserting a metal plate on a back surface (the –Z side) of the magnetic member 33, it is possible to insert an electronic substrate between the back surface (the –Z side) of the metal plate and the conductive case 35 and to secure a larger installation area.

Figure 5:
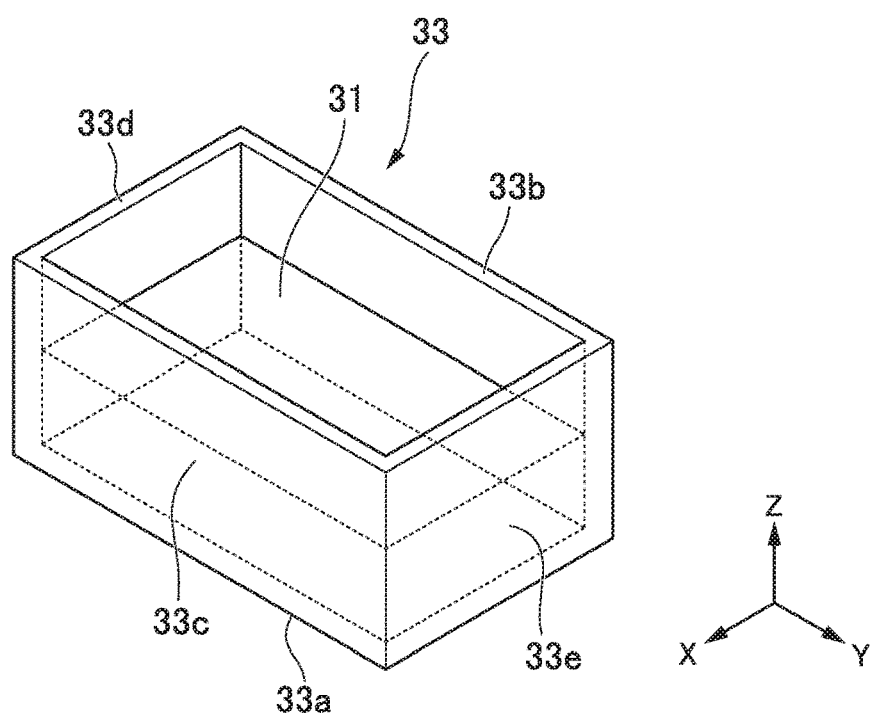
FIG. 5 is a perspective view showing a magnetic member provided in the modem according to the first embodiment of the present invention.

FIG. 5 is a perspective view showing the magnetic member provided in the modem according to the first embodiment of the present invention. As shown in FIG. 5, the magnetic member 33 is, for example, a bottomed rectangular ring-shaped member formed of a combination of a plate-shaped bottom plate member 33a and plate-shaped side plate members 33b, 33c, 33d, and 33e arranged along the sides of the bottom plate member 33a. The bottom plate member 33a is disposed, for example, in the XY plane. The side plate members 33b and 33c are disposed, for example, parallel to the YZ plane along the –X and +X sides of the bottom plate member 33a, respectively. The side plate members 33d and 33e are disposed, for example, parallel to the ZX plane along the –Y and +Y sides of the bottom plate member 33a, respectively.

As shown in FIG. 5, the antenna module 31 is arranged in the inner space of the magnetic member 33 such that the bottom plate member 33a is positioned on the –Z side, the side plate member 33b is positioned on the –X side, the side plate member 33c is positioned on the +X side, and the side plate member 33d is positioned on the –Y side, and the side plate member 33e is positioned on the +Y side. This arrangement allows electromagnetic fields acting on the loop antenna 21 to be formed along the bottom plate member 33a and the side plate members 33b, 33c, 33d, and 33e that constitute the magnetic member 33. Therefore, it is possible to obtain magnetic field characteristics equal to or better than those of a free space even under shielding by the conductive case 35.

The plastic case 34 is a case that houses the antenna module 31, the modem circuit board 32, and the magnetic member 33. The plastic case 34 houses the antenna module 31, the modem circuit board 32, and the magnetic member 33 to prevent positional deviations of the antenna module 31, the modem circuit board 32, and the magnetic member 33. For example, the plastic case 34 may be molded together with the antenna module 31, the modem circuit board 32, and the magnetic member 33.

The conductive case 35 is a case that covers the plastic case 34. The conductive case 35 is formed of, for example, a conductive resin having a conductivity equivalent to that of a metal such as carbon fiber reinforced plastic (CFRP) or conductive ABS. The conductive case 35 has a rectangular parallelepiped shape and has an opening portion formed in a part of the +Z side surface thereof (i.e., in a part thereof where the +Z side of the loop antenna 21 is positioned). The part where the opening portion is formed has a transmitting/receiving portion RT through which wireless signals used for short-range wireless communication are transmitted and received. The area of the transmitting/receiving portion RT is set to, for example, 400 mm$^2$ or less due to explosion proof limitations.

The purpose of covering the plastic case 34 with the conductive case 35 except for the transmitting/receiving portion RT is to satisfy explosion-proof standards. That is, when the plastic case 34 is not covered with the conductive case 35, there is a possibility that static electricity may be generated, for example, as the clothes of the worker handling the modem 20 rub against the plastic case 34. On the other hand, when the plastic case 34 is covered with the conductive case 35, generation of such static electricity is prevented, satisfying explosion-proof standards. The reason why the transmitting/receiving portion RT is not covered with the conductive case 35 is to secure the path for wireless signals to ensure short-range wireless communication.

Figure 6:
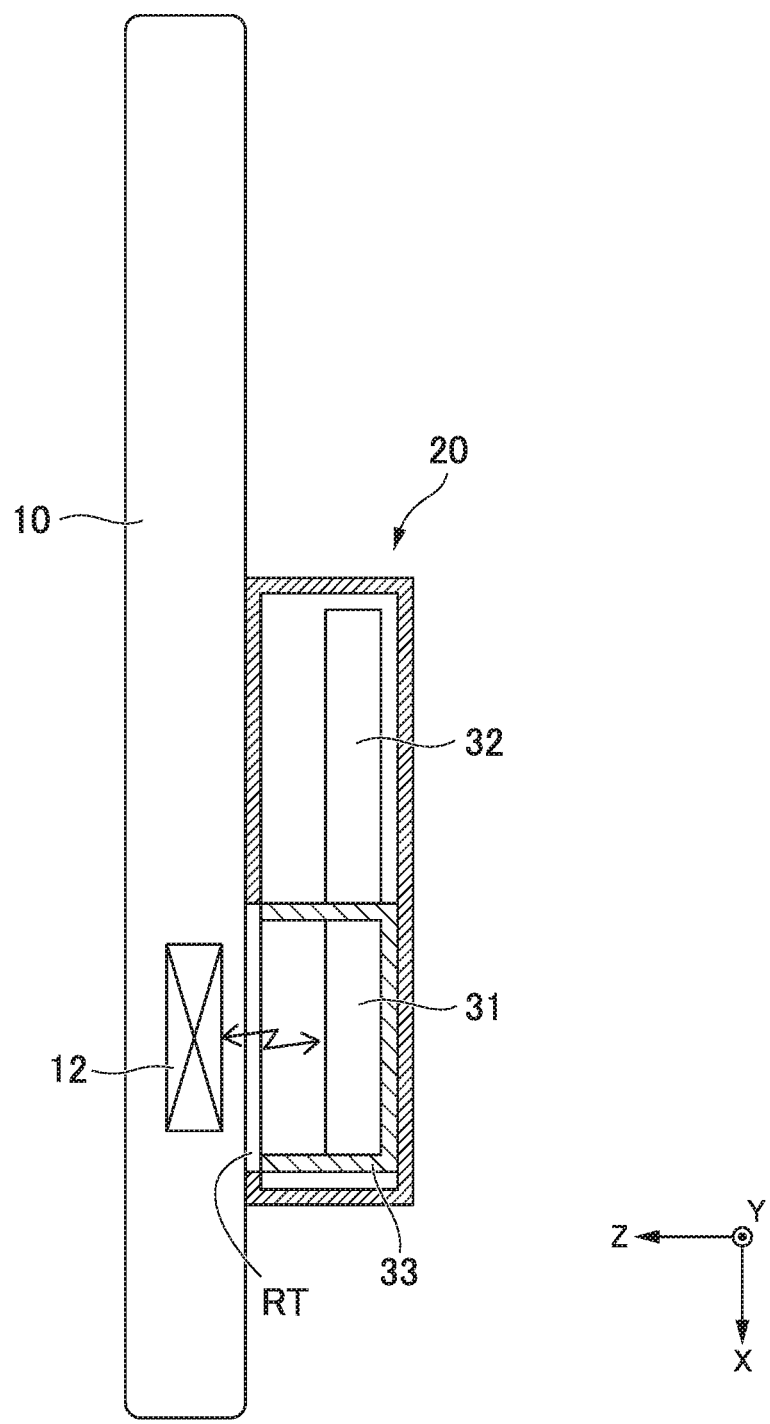
FIG. 6 is a cross-sectional view showing exemplary mounting of a modem according to the first embodiment of the present invention.

FIG. 6 is a cross-sectional view showing exemplary mounting of the modem according to the first embodiment of the present invention. FIG. 6 shows exemplary mounting when the terminal device 10 is a tablet computer. As shown in FIG. 6, the modem 20 is mounted on the terminal device 10 such that the transmitting/receiving portion RT of the modem 20 is in close contact with a position of the terminal device 10 at which the loop antenna 12 is attached to the terminal device 10. Thereby, the loop antenna 12 of the terminal device 10 and the antenna module 31 (the loop antenna 21) of the modem 20 are disposed close to each other, enabling short-range wireless communication between the terminal device 10 and the modem 20.

As shown in FIG. 6, most of the periphery of the space between the loop antenna 12 of the terminal device 10 and the antenna module 31 (the loop antenna 21) of the modem 20 is covered with the magnetic member 33 (the side plate members 33b, 33c, 33d, and 33e shown in FIG. 5) and the −Z side of the antenna module 31 of the modem 20 is also covered with the magnetic member 33 (the bottom plate member 33a shown in FIG. 5). As a result, it is possible to obtain magnetic field characteristics equal to or better than those of a free space even under shielding by the conductive case 35, enabling short-range wireless communication between the terminal device 10 and the modem 20.

Next, the operation of the electronic device 1 having the above configuration will be described. An operation in which the terminal device 10 reads the status ST stored in the memory 23 of the modem 20 (hereinafter referred to as a "status reading operation"), an operation in which the terminal device 10 transmits data to the field device FD (hereinafter, referred to as a "data transmission operation"), and an operation in which the terminal device 10 receives data transmitted from the field device FD (hereinafter referred to as a "data reception operation") will be described below.

<Status Reading Operation>

In the terminal device 10, the NFC control module 11 is controlled by a control device (not shown). In the terminal device 10, under the control of the NFC control module 11, an operation of reading the status ST stored in the memory 23 of the modem 20 is performed at predetermined time intervals (for example, every several milliseconds). Thereby, a wireless signal indicating a request to read the status ST is transmitted from the loop antenna 12 of the terminal device 10 at predetermined time intervals.

The wireless signal transmitted from the loop antenna 12 of the terminal device 10 is received by the loop antenna 21 of the modem 20. Since the wireless signal transmitted from the loop antenna 12 of the terminal device 10 is shielded by the magnetic member 33 provided in the modem 20, the wireless signal is prevented from being radiated to the outside. When the loop antenna 21 receives a wireless signal, an induced current flows through the loop antenna 21. The power supply 27 rectifies and smooths this induced current to generate power for operating the modem 20.

The power generated by the power supply 27 is supplied to the NFC control module 22, the memory 23, the controller 24, and the communicator 25 provided in the modem 20, such that the modem 20 enters an operating state. When the modem 20 is in an operating state, the NFC control module 22 reads the status ST stored in the memory 23 in accordance with the read request transmitted from the terminal device 10. Then, to return the status ST to the terminal device 10, the NFC control module 22 performs an operation of causing a load variation corresponding to the content of the status ST.

When the NFC control module 22 of the modem 20 performs an operation of causing a load variation, the load variation appears as a load variation in the loop antenna 12. Therefore, when the NFC control module 22 of the modem 20 performs an operation of causing a load variation corresponding to the status ST, the load variation appearing in the loop antenna 12 is that corresponding to the status ST. Accordingly, the NFC control module 11 can receive the status ST by detecting the load variation in the loop antenna 12. In this manner, the terminal device 10 reads the status ST stored in the memory 23 of the modem 20.

By performing such an operation, it is possible to speed up bidirectional communication between the terminal device 10 and the field device FD, which will be described below, via the modem 20. The modem 20 can operate stably since the power supply from the terminal device 10 to the modem 20 in a noncontact manner is performed at predetermined time intervals.

<Data Transmission Operation>

When the control device (not shown) in the terminal device 10 instructs that data be transmitted to the field device FD, an operation of causing the memory 23 of the modem 20 to store data that is to be transmitted to the field device FD as data DT is performed under the control of the NFC control module 11. Accordingly, the loop antenna 12 of the terminal device 10 transmits a wireless signal indicating a data write request.

The wireless signal transmitted from the loop antenna 12 of the terminal device 10 is received by the loop antenna 21 of the modem 20. In accordance with the write request transmitted from the terminal device 10, the NFC control module 22 performs control to store the transmitted data in the memory 23 as the data DT. Upon completion of this operation, for example, the data DT is stored in the memory 23, and the NFC control module 22 performs an operation of reflecting information indicating that the data DT is data (first data) for the field device FD received by the NFC control module 22 in the status ST and providing a corresponding notification to the controller 24.

Upon receiving the notification from the NFC control module 22, the controller 24 performs an operation of reading and outputting the data DT stored in the memory 23 to the communicator 25 and clearing the content of the status ST. The data DT output from the controller 24 is transmitted from the communicator 25 to the field device FD via the cable 26. Data transmission from the terminal device 10 to the field device FD is performed in this manner.

<Data Reception Operation>

When the control device (not shown) in the terminal device 10 instructs that data be received from the field device FD, an operation of reading data from the field device FD is performed under the control of the NFC control module 11. Accordingly, the loop antenna 12 of the terminal device 10 transmits a wireless signal indicating a data reception request.

The wireless signal transmitted from the loop antenna 12 of the terminal device 10 is received by the loop antenna 21 of the modem 20. The NFC control module 22 performs an operation of notifying the controller 24 of the reception request transmitted from the terminal device 10. Upon receiving the notification from the NFC control module 22, the controller 24 performs an operation of causing the memory 23 to store the data received by the communicator 25 as data DT.

When the data DT is stored in the memory 23, the NFC control module 22 performs an operation of reading the data DT stored in the memory 23 and causing a load variation corresponding to the content of the data DT. As described above, when the NFC control module 22 of the modem 20 performs an operation of causing a load variation, the load variation appears as a load variation in the loop antenna 12 of the terminal device 10. Accordingly, the NFC control module 11 of the terminal device 10 can receive the data from the field device FD by detecting the load variation in the loop antenna 12. In this manner, the terminal device 10 receives the data transmitted from the field device FD.

In the present embodiment, the NFC control module 22 that performs short-range wireless communication with the terminal device 10, the communicator 25 that performs wired communication with the field device FD, and the controller 24 that controls data exchanged between the NFC control module 22 and the communicator 25 are provided in the modem 20, and the modem 20 operates with power supplied in a noncontact manner from the terminal device 10 as described above. Accordingly, wireless signals are not spontaneously transmitted from the modem 20, it is not necessary to physically connect to the terminal device 10 to receive power supply from the terminal device 10, and it is also not necessary to incorporate a battery. Therefore, it is possible to reduce the time required for wireless standard certification and explosion-proof certification while incurring no increase in size and weight.

In the present embodiment, the loop antenna 21 provided in the modem 20 is covered with the magnetic member 33 except for one surface side (the +Z side) of the loop antenna 21. Thus, electromagnetic fields radiated from the loop antenna 12 of the terminal device 10 can be efficiently coupled to the loop antenna 21, and therefore it is possible to increase the quality of short-range wireless communication while increasing the efficiency of power supply to the modem 20.

The modem 20 is mounted on the terminal device 10 such that the transmitting/receiving portion RT of the modem 20 is in close contact with a position of the terminal device 10 at which the loop antenna 12 is attached to the terminal device 10, thus achieving a structure of sealing by the conductive case 35, and therefore wireless signals used for short-range wireless communication can be prevented from being radiated to the outside. Thus, it is possible to take electromagnetic compatibility (EMC) measures. In the present embodiment, the outer surface of the modem 20 is covered with the conductive case 35 except for the transmitting/receiving portion RT and therefore it is possible to prevent generation of static electricity, satisfying explosion-proof standards.

Second Embodiment

Figure 7:
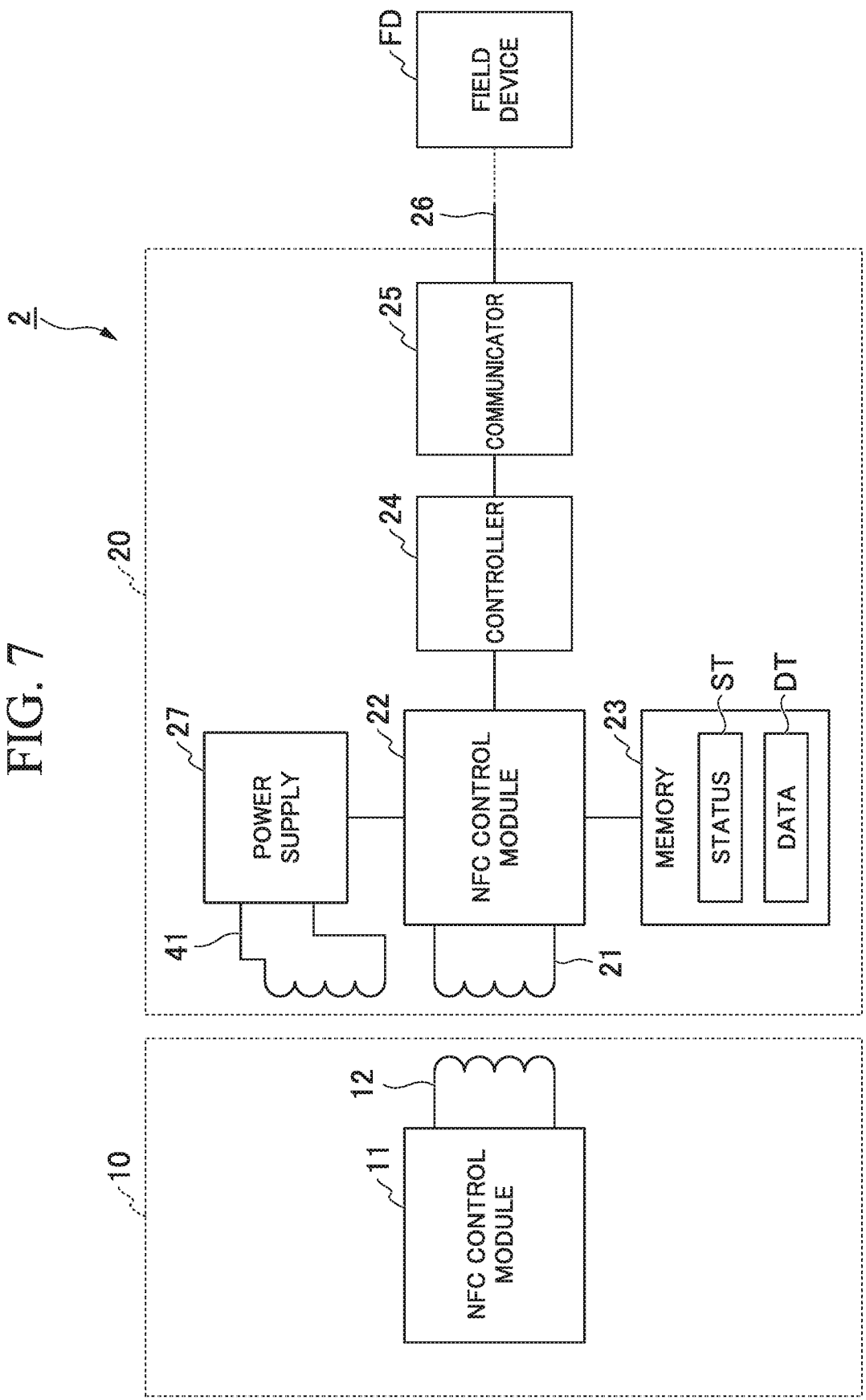
FIG. 7 is a block diagram showing a configuration of main parts of an electronic device according to a second embodiment of the present invention.

FIG. 7 is a block diagram showing a configuration of main parts of an electronic device according to a second embodiment of the present invention. In FIG. 7, the same reference numerals are assigned to blocks corresponding to those shown in FIG. 1. The electronic device 2 according to the present embodiment differs from the electronic device 1 shown in FIG. 1 in that a modem 20 includes a loop antenna 41 (a second loop antenna) in addition to a loop antenna 21 and a power supply 27 of the modem 20 generates power required for the operation of the modem 20 from power flowing through the loop antennas 21 and 41.

The loop antenna 41 is provided to receive more power supplied in a noncontact manner from the terminal device 10. As described above, the area of the transmitting/receiving portion RT is set to, for example, 400 mm$^2$ or less due to explosion proof limitations. The size of the loop antenna 21 is set according to the area of the transmitting/receiving portion RT. However, as the loop antenna 21 decreases in size, the amount of power that can be received by the loop antenna 21 also decreases, and the received power may be insufficient, short of what is required for the operation of the modem 20. In the present embodiment, the loop antenna 41 is provided in addition to the loop antenna 21 to obtain sufficient power for the operation of the modem 20.

Figure 8:
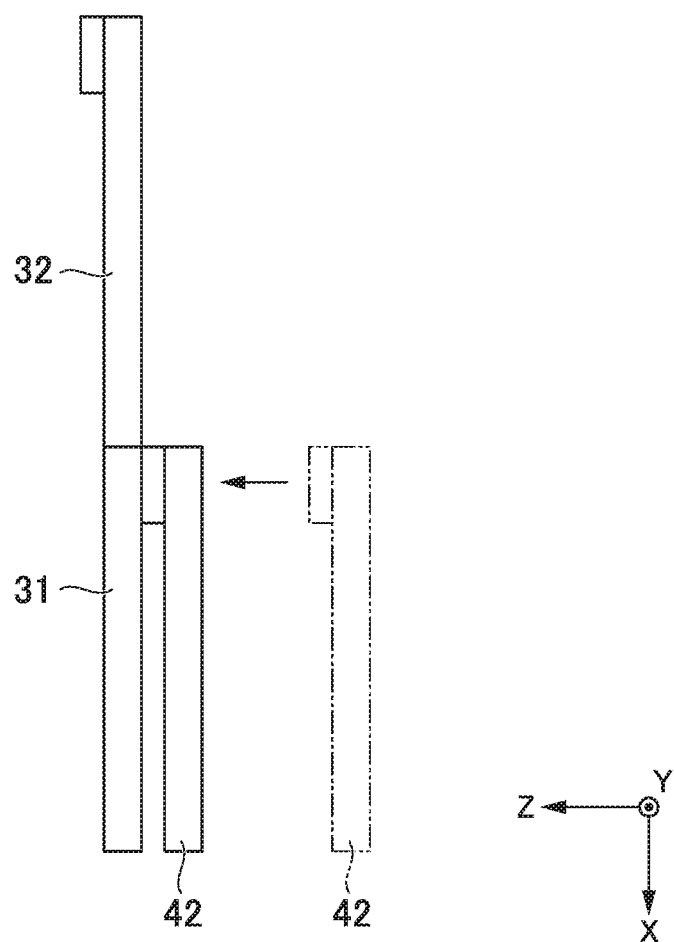
FIG. 8 is a diagram showing exemplary installation of loop antennas according to the second embodiment of the present invention.

FIG. 8 is a diagram showing exemplary installation of the loop antennas according to the second embodiment of the present invention. As shown in FIG. 8, an antenna module 42 in which the loop antenna 41 is provided is arranged on the −Z side of an antenna module 31 such that the antenna module 42 overlaps the antenna module 31 in which the loop antenna 21 is provided. For example, when viewing from the +Z side to the −Z side, the antenna module 42 and the antenna module 31 are arranged overlapping each other such that the loop antenna 21 and the loop antenna 41 are concentric (or substantially concentric) with each other. The antenna module 42 may also be arranged on the +Z side of the antenna module 31. The antenna modules 31 and 42 overlapping each other in such a manner are arranged in the inner space (see FIG. 5) of the magnetic member 33.

In the present embodiment, in addition to the loop antenna 21, the loop antenna 41 is provided in the modem 20 such that the power supply 27 of the modem 20 generates power required for the operation of the modem 20 from power flowing through the loop antennas 21 and 41 as described above. Therefore, even when the area of the transmitting/receiving portion RT is limited, it is possible to receive sufficient power for the operation of the modem 20 from power supplied in a noncontact manner from the terminal device 10. Since the electronic device 2 of the present embodiment is identical to the electronic device 1 of the first embodiment except that the modem 20 includes the loop antenna 41 in addition to the loop antenna 21, it is possible to achieve advantages such as being able to reduce the time required for wireless standard certification and explosion-proof certification while incurring no increase in size and weight, similar to the first embodiment.

Third Embodiment

Figure 9:
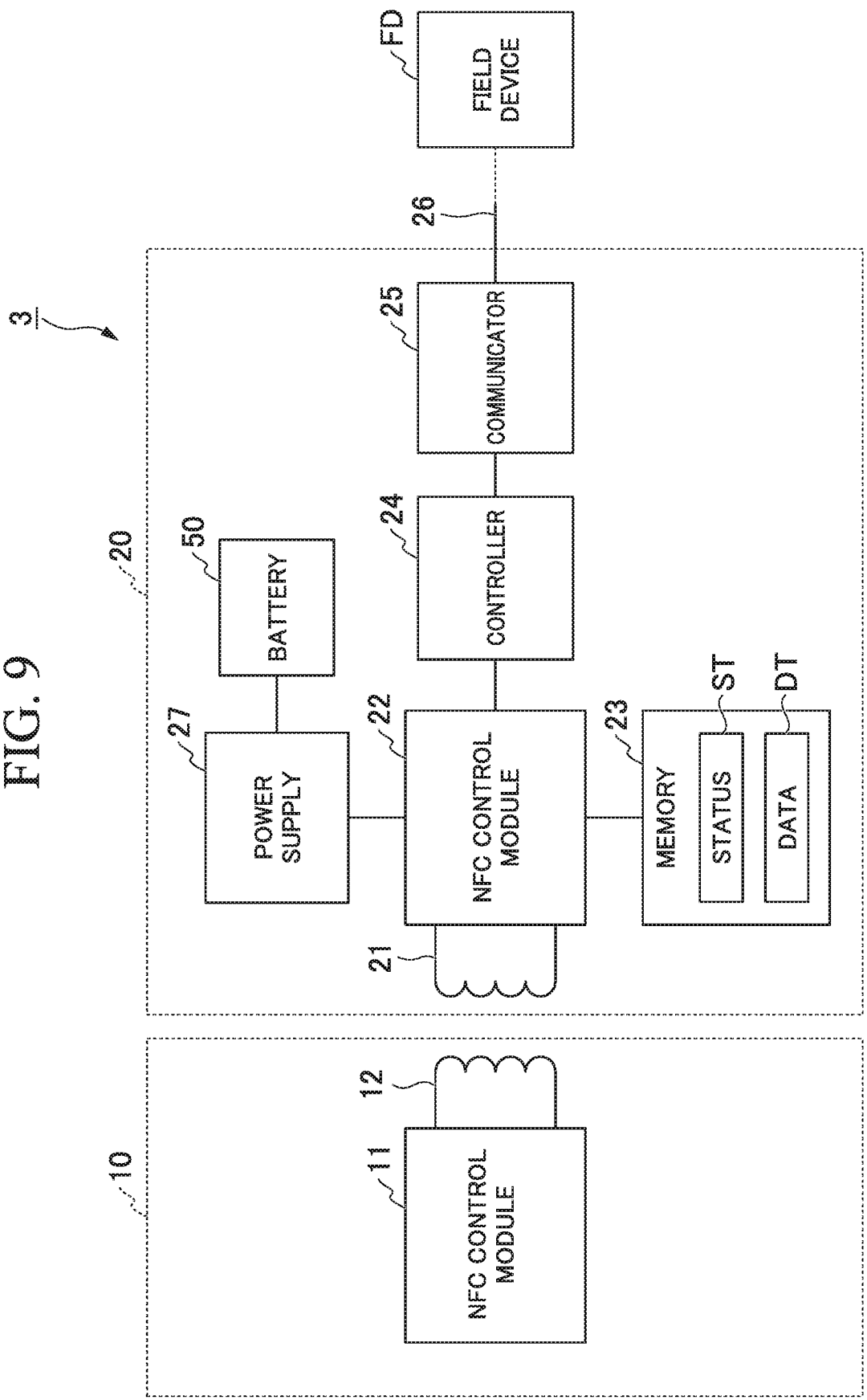
FIG. 9 is a block diagram showing a configuration of main parts of an electronic device according to a third embodiment of the present invention.

FIG. 9 is a block diagram showing a configuration of main parts of an electronic device according to a third embodiment of the present invention. Similar to FIG. 7, in FIG. 9, the same reference numerals are assigned to blocks corresponding to those shown in FIG. 1. The electronic device 3 according to the present embodiment differs from the electronic device 1 shown in FIG. 1 in that a modem 20 includes a battery 50 and the modem 20 operates using both power generated by a power supply 27 and power of the battery 50.

Figure 10A:
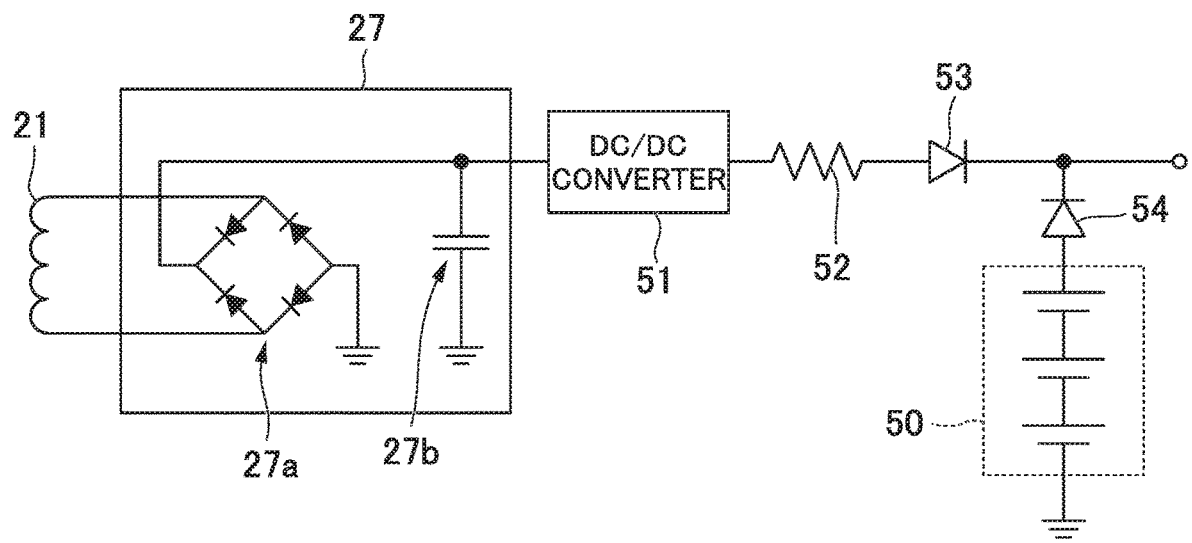
FIGS. 10A and 10B are diagrams showing exemplary configurations of a connection circuit between a power supply and a battery according to a third embodiment of the present invention.
Figure 10B:
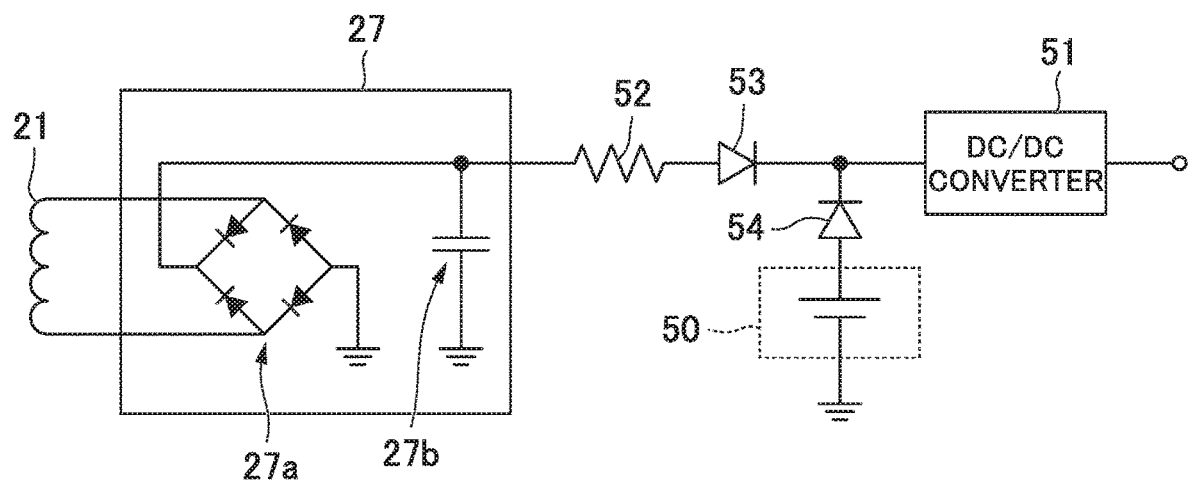

FIGS. 10A and 10B are diagrams showing exemplary configurations of a connection circuit between the power supply and the battery according to the third embodiment of the present invention. As shown in FIGS. 10A and 10B, the power supply 27 includes a full-wave rectification circuit 27$a$, the input terminal of which is connected to a loop antenna 21, and a smoothing capacitor 27$b$ connected to an output terminal of the full-wave rectification circuit 27$a$. The battery 50 in which three battery cells are connected in series is used in the connection circuit shown in FIG. 10A, and a battery 50 including only one battery cell is used in the connection circuit shown in FIG. 10B.

The connection circuit shown in FIG. 10A has a DC/DC converter 51, the input terminal of which is connected to an output terminal of the power supply 27, a resistor 52, one end of which is connected to an output terminal of the DC/DC converter 51, a diode 53, the anode of which is connected to the other end of the resistor 52 and the cathode of which is connected to each of the blocks of the modem 20 (an NFC control module 22, a memory 23, a controller 24, and a communicator 25), and a diode 54, the anode of which is connected to a positive electrode of the battery 50 and the cathode of which is connected to the cathode of the diode 53.

The connection circuit shown in FIG. 10A connects a circuit, which includes the power supply 27 and a booster circuit (the DC/DC converter 51), and the battery 50 in parallel. For example, the circuit including the power supply 27 and the DC/DC converter 51, and the battery 50 are connected in parallel between the connection to the each block of the modem 20 (an NFC control module 22, a memory 23, a controller 24, and a communicator 25) and the ground. When this connection circuit is used, the voltage of the battery 50 is set to a voltage required for each block of the modem 20, and the DC/DC converter 51 boosts the output voltage of the power supply 27 up to that equal (substantially equal) to the voltage of the battery 50.

The connection circuit shown in FIG. 10B has a resistor 52, one end of which is connected to an output terminal of the power supply 27, a diode 53, the anode of which is connected to the other end of the resistor 52 and the cathode of which is connected to an input terminal of a DC/DC converter 51, the DC/DC converter 51, the output terminal of which is connected to each block of the modem 20 (an NFC control module 22, a memory 23, a controller 24, and a communicator 25), and a diode 54, the anode of which is connected to a positive electrode of the battery 50 and the cathode of which is connected to the cathode of the diode 53.

The connection circuit shown in FIG. 10B connects a circuit including the power supply 27 and the battery 50 in parallel and that is connected to the input terminal of the booster circuit (the DC/DC converter 51). For example, the circuit including the power supply 27 and the battery 50 are connected in parallel the connection to the each block of the modem 20 and the ground. When this connection circuit is used, the output voltage of both the power supply 27 and the battery 50 is lower than the voltage required for each block of the modem 20, and the DC/DC converter 51 boosts the output voltage of the power supply 27 and the battery 50 up to the voltage required for each block of the modem 20.

In the present embodiment, the battery 50 is provided in the modem 20 such that the modem 20 operates using both power generated by the power supply 27 and power of the battery 50 as described above. Therefore, power consumption of the battery 50 can be suppressed and the replacement time of the battery 50 can be lengthened. Since the electronic device 3 of the present embodiment is identical to the electronic device 1 of the first embodiment except that the modem 20 includes the battery 50, it is possible to achieve advantages such as being able to reduce the time required for wireless standard certification and explosion-proof certification while incurring no increase in size and weight, similar to the first embodiment.

Fourth Embodiment

Figure 11:
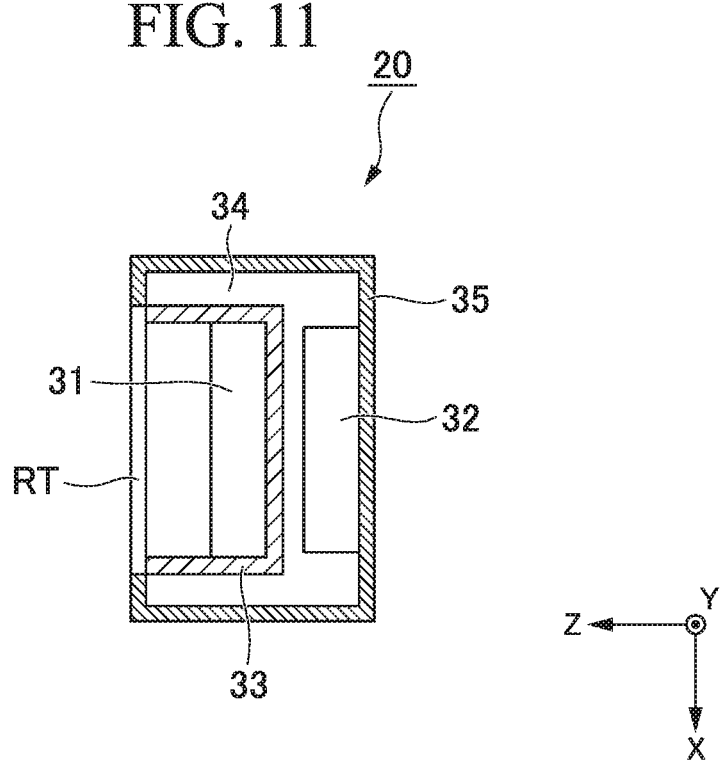
FIG. 11 is a cross-sectional view of a modem according to a fourth embodiment of the present invention.

FIG. 11 is a cross-sectional view of a modem according to a fourth embodiment of the present invention. As shown in FIG. 11, the modem 20 of the present embodiment includes an antenna module 31, a modem circuit board 32, a magnetic member 33, a plastic case 34, and a conductive case 35, similar to the modem 20 shown in FIG. 3. However, a difference is that the modem circuit board 32 is arranged on the −Z side of the magnetic member 33.

In the present embodiment, the size in the XY plane of the modem circuit board 32 can be reduced compared to the modem 20 of the first embodiment (see FIGS. 2 to 4) since the modem circuit board 32 is arranged on the −Z side of the magnetic member 33 as described above. Since the modem 20 of the present embodiment is identical to the modem 20 of the first embodiment except that the modem circuit board 32 is arranged on the −Z side of the magnetic member 33, it is possible to achieve advantages such as being able to reduce the time required for wireless standard certification and explosion-proof certification while incurring no increase in size and weight, similar to the first embodiment.

Although the modem and the electronic device according to the embodiments of the present invention have been described above, the present invention is not limited to the embodiments and changes can be made freely within the scope of the present invention. For example, it is possible to appropriately combine the first to fourth embodiments. The number of loop antennas provided in the modem 20 is not limited to one or two, and may be three or more. When the number of loop antennas provided is increased such that it is possible to receive power of about 100 mW, it is also possible to house a communication module that can perform optical wireless data communication using infrared light in compliance with IrDA.

A part of the power supplied in a noncontact manner from the terminal device 10 to the modem 20 may be supplied from the modem 20 to the field device FD. By doing so, it is possible to perform various settings and various adjustments for the field device FD even when there is no power supply for the field device FD.

What is claimed is:

1. A modem configured to communicatively connect a terminal device to a field device, the modem comprising:
   a wireless communicator configured to operate by power supplied in a noncontact manner from the terminal device and to perform short-range wireless communication with the terminal device;
   a wired communicator configured to operate by power supplied in a noncontact manner from the terminal device and to perform wired communication with the field device;
   a controller configured to operate by power supplied in a noncontact manner from the terminal device and to control data exchanged between the wireless communicator and the wired communicator;
   a first loop antenna connected to the wireless communicator and configured to transmit and receive wireless signals that are used in the short-range wireless communication;
   a magnetic member arranged to cover the first loop antenna except for one surface side of the first loop antenna;
   a power supply configured to generate the power from an induced current that flows through the first loop antenna, the induced current being caused by the short-range wireless communication; and
   a second loop antenna arranged overlapping the first loop antenna and connected to the power supply,
   wherein the power supply is configured to generate the power from induced currents that flow through the first and second loop antennas, the induced currents being caused by the short-range wireless communication.

2. The modem according to claim 1, further comprising:
a storage configured to operate by power supplied in a noncontact manner from the terminal device and storing first data for the field device received by the wireless communicator and second data for the terminal device received by the wired communicator,
wherein the controller is configured to read and output the first data stored in the storage to the wired communicator and to store the second data received by the wired communicator into the storage.

3. The modem according to claim 2, wherein
the storage stores status information including information indicating whether or not at least one of the first data and the second data is stored in the storage and information indicating the type of the at least one of the first data and the second data stored in the storage, and
the wireless communicator is configured to read the status information stored in the storage in accordance with a read request received from the terminal device and to transmit the read status information to the terminal device.

4. The modem according to claim 1, further comprising:
a battery connected in parallel to an output of the power supply.

5. The modem according to claim 4, wherein at least one of the wireless communicator, the wired communicator, and the controller is configured to operate by the power generated by the power supply and power of the battery.

6. The modem according to claim 4, further comprising:
a booster circuit configured to boost output voltage of the power supply.

7. The modem according to claim 6, wherein a circuit comprising the power supply and the booster circuit, and the battery are connected in parallel.

8. The modem according to claim 6, wherein the power supply and the battery connected in parallel to each other is connected to the booster circuit.

9. The modem according to claim 1, wherein
the one surface side of the first loop antenna which is not covered with the magnetic member acts as a transceiver and receiver which transfers and receives electromagnetic waves used for the short-range wireless communication, and
the modem further comprises a housing, at least a surface of the housing except for the transceiver and receiver being formed of a conductive material.

10. The modem according to claim 9, wherein the modem is mounted on the terminal device, the transceiver and receiver of the modem being in close contact with a position of the terminal device at which an antenna is attached to the terminal device.

11. The modem according to claim 1, wherein the first loop antenna and the second loop antenna are concentric with each other.

12. An electronic device comprising:
a terminal device comprising an antenna and configured to perform short-range wireless communication; and
a modem configured to communicatively connect the terminal device to a field device, the modem comprising:
a wireless communicator configured to operate by power supplied in a noncontact manner from the terminal device and to perform short-range wireless communication with the terminal device;
a wired communicator configured to operate by power supplied in a noncontact manner from the terminal device and to perform wired communication with the field device;
a controller configured to operate by power supplied in a noncontact manner from the terminal device and to control data exchanged between the wireless communicator and the wired communicator;
a first loop antenna connected to the wireless communicator and configured to transmit and receive wireless signals that are used in the short-range wireless communication;
a magnetic member arranged to cover the first loop antenna except for one surface side of the first loop antenna;
a power supply configured to generate the power from an induced current that flows through the first loop antenna, the induced current being caused by the short-range wireless communication; and
a second loop antenna arranged overlapping the first loop antenna and connected to the power supply,
wherein the power supply is configured to generate the power from induced currents that flow through the first and second loop antennas, the induced currents being caused by the short-range wireless communication, and
the first loop antenna is disposed close to the antenna of the terminal device.

13. The electronic device according to claim 12, wherein the modem further comprises:
a battery connected in parallel to an output of the power supply.

14. The electronic device according to claim 12, wherein
the one surface side of the first loop antenna which is not covered with the magnetic member acts as a transceiver and receiver which transfers and receives electromagnetic waves used for the short-range wireless communication, and
the modem further comprises a housing, at least a surface of the housing except for the transceiver and receiver being formed of a conductive material.

15. The electronic device according to claim 14, wherein the modem is mounted on the terminal device, the transceiver and receiver of the modem being in close contact with a position of the terminal device at which an antenna is attached to the terminal device.

* * * * *